(12) United States Patent
Sadr et al.

(10) Patent No.: US 6,508,275 B1
(45) Date of Patent: Jan. 21, 2003

(54) FLEXIBLE FUEL FILLER PIPE

(75) Inventors: Changize Sadr, North York (CA); Sam Shafiee, Etobicoke (CA)

(73) Assignee: Salflex Polymers Ltd., Weston (CA)

( * ) Notice: Subject to any disclaimer, the term of this patent is extended or adjusted under 35 U.S.C. 154(b) by 0 days.

(21) Appl. No.: 09/525,551

(22) Filed: Mar. 15, 2000

(51) Int. Cl.⁷ .................................................. F16L 11/11
(52) U.S. Cl. .................... 138/109; 138/120; 138/121; 138/119; 138/DIG. 11; 285/290.3; 285/290.4
(58) Field of Search .............................. 138/109, 96 R, 138/119, 121, 120, DIG. 11, 122; 285/57, 286.2, 290.4, 290.3

(56) References Cited

U.S. PATENT DOCUMENTS

| | | | | |
|---|---|---|---|---|
| 2,836,181 A | * | 5/1958 | Tapp | 138/121 |
| 3,060,069 A | * | 10/1962 | Sindars | 138/121 |
| 3,838,713 A | * | 10/1974 | Tubbs | 138/109 |
| 4,522,775 A | | 6/1985 | Briggs et al. | |
| 4,647,509 A | | 3/1987 | Wallace et al. | |
| 4,675,780 A | | 6/1987 | Barnes et al. | |
| 4,705,708 A | | 11/1987 | Briggs et al. | |
| 5,139,043 A | | 8/1992 | Hyde et al. | |
| 5,284,184 A | * | 2/1994 | Noone et al. | 138/121 |
| 5,305,799 A | * | 4/1994 | Dal Palu | 138/109 |
| 5,373,870 A | | 12/1994 | Derroire et al. | |
| 5,404,907 A | | 4/1995 | Benjey et al. | |
| 5,443,098 A | | 8/1995 | Kertesz | |
| 5,472,746 A | * | 12/1995 | Miyajima et al. | 138/109 |
| 5,472,754 A | | 12/1995 | Douchet et al. | |
| 5,514,299 A | | 5/1996 | Kalwara | |
| 5,529,743 A | * | 6/1996 | Powell | 264/513 |
| 5,858,492 A | | 1/1999 | Roeber | |
| 5,960,977 A | | 10/1999 | Ostrander et al. | |
| 5,971,033 A | * | 10/1999 | Lanz | 138/121 |
| 5,983,950 A | * | 11/1999 | Aoki et al. | 138/109 |
| 6,142,188 A | * | 11/2000 | Schaerfl et al. | 138/121 |
| 6,170,535 B1 | * | 1/2001 | Sadr et al. | 138/137 |

FOREIGN PATENT DOCUMENTS

| | | |
|---|---|---|
| DE | 34 22345 A1 | 12/1985 |
| DE | 42 14 076 A1 | 11/1992 |
| DE | 195 35 413 C1 | 10/1996 |
| EP | 0 626 256 A1 | 11/1994 |
| EP | 0 638 749 A1 | 2/1995 |
| EP | 0 730 115 A1 | 9/1996 |
| EP | 0 754 897 A1 | 1/1997 |
| EP | 1 024 046 A2 | 8/2000 |
| EP | 1 055 856 A2 | 11/2000 |
| JP | 4-259545 | 2/1991 |
| WO | PCT/US90/07327 | 7/1991 |

\* cited by examiner

*Primary Examiner*—James Hook
(74) *Attorney, Agent, or Firm*—Bereskin & Parr (57) ABSTRACT

A molded fuel filler pipe for use in automobiles, in particular cars, comprises a one-piece structure which is blow molded. The conduit produced in the blow mold has a smooth edged tubular portion and a bellows portion which is molded at the same time. By deforming the bellows portion, flexibility in the relative location of the two ends of the conduit is provided. This eliminates taking two separate pieces and joining those pieces which may give rise to fuel vapour permeation through the joints.

16 Claims, 9 Drawing Sheets

FLEXIBLE FUEL FILLER PIPE

FIELD OF THE INVENTION

This invention relates generally to conduits which may be used to handle hydrocarbon fuels, principally gasoline. In particular, the invention relates to a flexible fuel filler pipe which is manufactured as a unitary structure from thermo plastics which are relatively rigid but which has flexibility, typically required in an automotive environment.

BACKGROUND OF THE INVENTION

Vehicles having hydrocarbon burning fuels require a tank for containing the fuel. Typically the fuel used is gasoline. Because the gasoline represents a danger for leakage and may be explosive during crash conditions, the fuel tank is contained within a reinforced or otherwise protected area to provide the appropriate crash protection. In order to provide convenient access to the tank, the vehicle is typically fitted with a fuel filler inlet. Thus, there is required a conduit to extend between the fuel filler inlet and the tank. That conduit may be long or short and may be of convoluted configuration depending upon the relative location of the tank and the filler inlet.

Typically the filler inlet location will be defined by body panel structure such as the fender of a vehicle. The tank may be mounted to structural components of the vehicle such as a unibody structure or frame, sub-assembly or the like. To assist in mounting the fuel tank and filler in the vehicle and to provide for movement as may occur under vibration or flexing of the vehicle chassis or the like, some degree of flexibility is normally required so that one end of the conduit may be moved relative to the other end. This flexibility also is utilized during the vehicle assembly process.

Most hydrocarbon containing fuels are relatively volatile. Typically the fuel tank and now the fuel filler conduit are manufactured so as to substantially inhibit passage of vapours from the liquid fuel to ambient atmosphere out the filler pipe.

An example of a means of inhibiting the passage of vapours through the wall of a fuel filler conduit is set out in our co-pending application Ser. No. 09/192,295, filed Nov. 17, 1998 and entitled Multi-Layer Conduit, the disclosure which is herein incorporated by reference.

In the past, fuel tanks have been manufactured from metal and the fuel filler conduit is also manufactured from metal. The metal while having some flexibility does not have the appropriate flexibility and thus some type of flexible component is provided in the fuel filler conduit to provide the desired flexibility in the relative location of the inlet and outlet ends of the conduit. In more recent developments, fuel tanks are being manufactured from thermosettable resins such as polyethylene and fuel filler conduits are also manufactured from such materials. Conduits manufactured from thermosettable resins such as polyethylene and the like are relatively rigid and some degree of flexibility must also be incorporated into such a conduit to provide the desired flexibility of the relative locations of the inlet and outlet ends of the conduit.

In previous conduits this has been achieved by using a length of tubing which is of a flexible rubber material. The more rigid portion of the fuel filler conduit is attached to the flexible component by means of a clamp typically referred to as a hose clamp. In many applications, the flexible component may be attached to a further run of conduit by a second hose clamp. In some other arrangements, the rubber portion is attached directly to a nipple or other fitting on the tank, again using a hose clamp.

Environmental regulations are requiring that the overall permeation of vapours from a vehicle be significantly restricted. These regulations are driving the need for better structures which will reduce or eliminate permeation. The fuel tank may be manufactured from a multi-layer structure incorporating a barrier layer or may be made from modified barrier resins such as polyamides or others which have sufficiently low permeation to be acceptable. With respect to the fuel filler conduit itself, the conduit may also be manufactured from multi-layer materials incorporating a barrier layer so as to very substantially inhibit permeation through the wall of the conduit as set out in application Ser. No. 09/192,259. When a rubber bellows type structure is used, a barrier layer may also be incorporated into the rubber to inhibit permeation through the wall of the bellows portion.

However, one of the areas that is now susceptible to permeation leakage is the joint formed by the bellows section and the more rigid portion of the conduit. The seal maintained by the hose clamp deteriorates over time, particularly with the use of polyethylene structures. Polyethylene tends to "flow" under stress and the seal can open with the passage of time to permit unacceptable amounts of permeation through the connection, even though there may be no liquid loss through such connection.

Accordingly, there is a need for a structure which will further reduce permeation from fuel tank filler conduits.

In accordance with the present invention a fuel filler conduit for use in automotive applications for connecting to a fuel tank comprises a single piece conduit having an inlet end, an outlet end, a first tubular portion and a second portion, wherein the first portion is generally rigid and has a fixed configuration, and the second portion comprises a bellows portion, and the second portion is located intermediate the inlet end and the outlet end, so that the relative location of the inlet end with respect to the outlet end may be changed by deforming the bellows portion.

The invention will be more clearly understood from reference to the attached drawings which illustrate a preferred embodiment of the invention and in which.

Figures 1, 3:
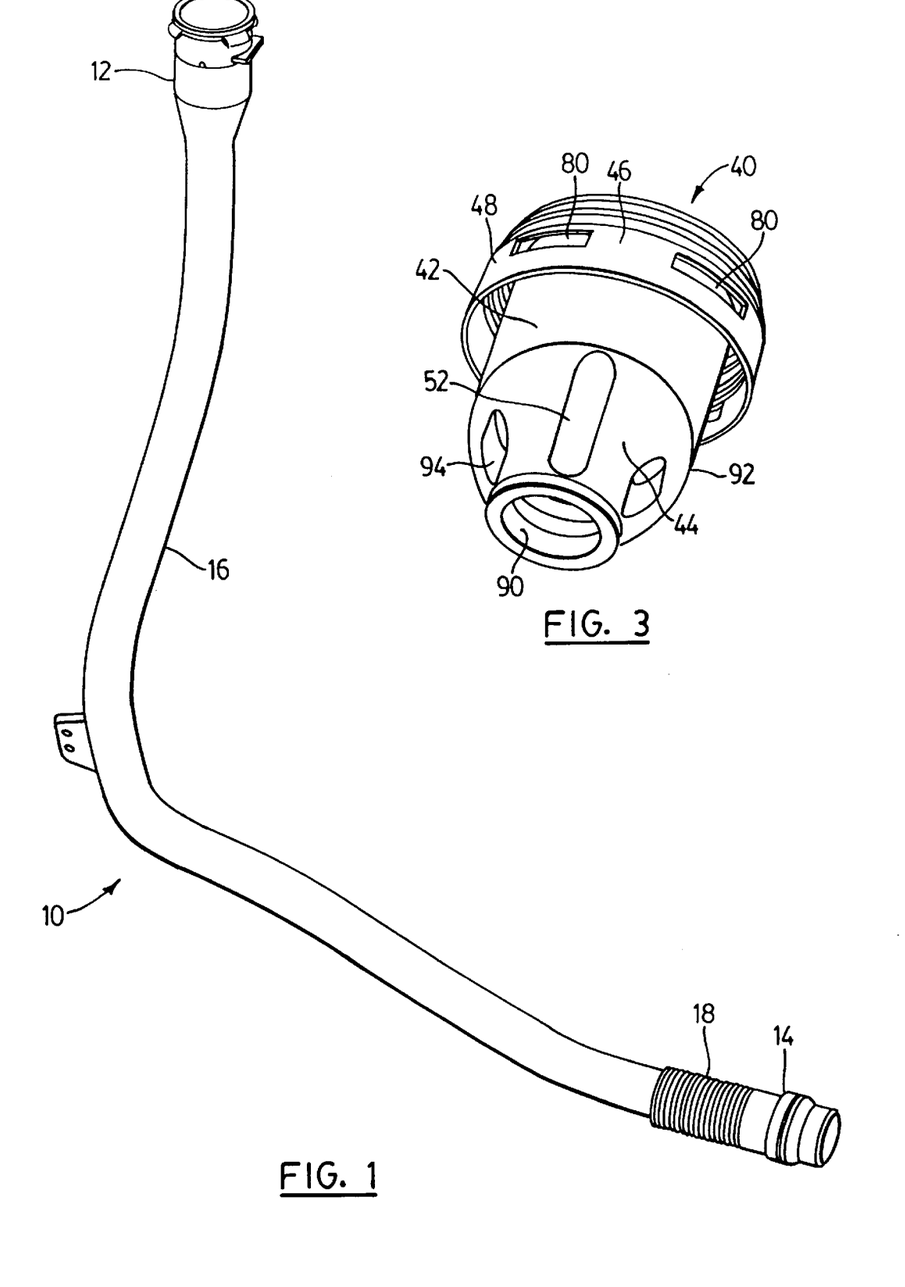
FIG. 1 is a perspective view of a filler conduit.
FIG. 3 is a perspective view of an insert in the inlet end of the conduit of FIG. 1.

With reference to FIG. 1, a conduit is shown generally at 10. The fuel filler conduit 10 has an inlet end 12 and an outlet end 14. The conduit includes a single piece molded portion comprising a first portion 16 and a second portion 18.

The first portion 16 is a generally rigid conduit and has a fixed configuration and has a relatively smooth outside wall and a relatively smooth inside wall. The first portion 16 may be of any configuration to meet the vehicle mounting and space limitations.

Figure 2:
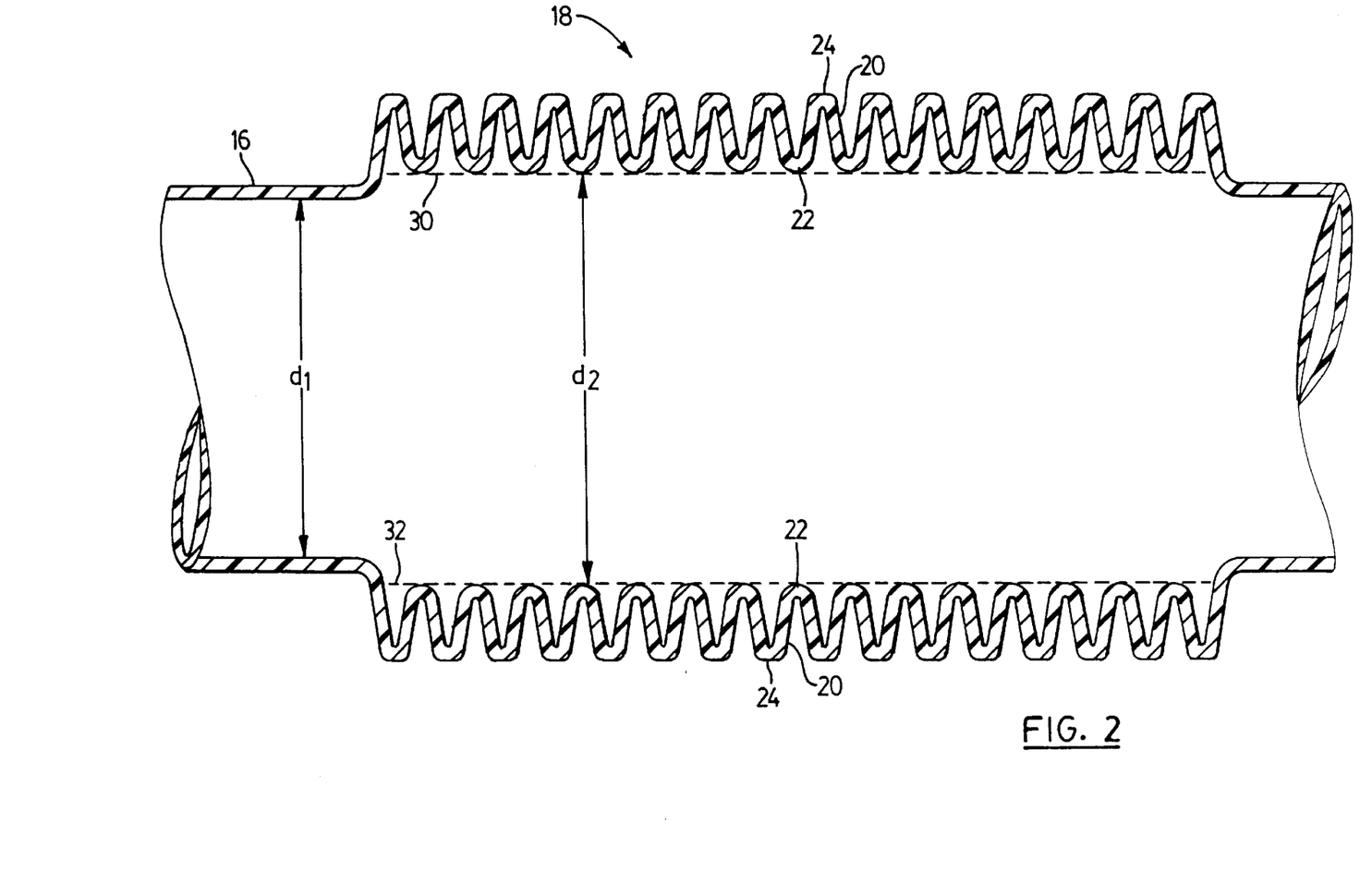
FIG. 2 is a cross-section through a portion of the conduit of FIG. 1.

The second portion 18 of the conduit 10 comprises a bellows section, the bellows portion 18 is shown more clearly in FIG. 2. FIG. 2 is a cross-section through the bellows portion 18 of the conduit 10. The bellows portion 18 is comprised of a plurality of convolutions 20. Each convolution 20 is defined by a root section 22 and a crown section 24.

The inside diameter of the first portion 16 is illustrated in FIG. 2 by the dimension $d_1$. The innermost diameter of a plurality of the root sections 22 of the convolutions 20 defines a general cylinder indicated by the dotted lines 30 and 32. The diameter of that cylinder is illustrated by the diameter $d_2$ in FIG. 2. Advantageously $d_2$ is larger than $d_1$.

As fuel flows along the inner surface of the conduit, static electricity is generated. More static electricity will be generated if the flow is more turbulent. Accordingly, both from an interest of maintaining as open a diameter for quick filling as possible as well as reducing turbulence as much as possible, $d_2$ is larger than $d_1$. This means that the effective open area of the conduit in the bellows portion 18 will be as large as the effective diameter in the rigid portion 16. Of course, the open area defined by the inner surface of each of the convolutions 20 will also add to the turbulence of the flow through the area defined by the bellows portion 18. This can be reduced by ensuring that the profiles of the root 22 are relatively flat comprising an almost planar portion parallel to the surface of the cylinder defined by the lines 30, 32. In more typical bellows construction, the convolutions may have a crown with a shape which is close to an apex and a root with a shape which is close to an apex. In the preferred embodiment of this invention, the convolutions 20 should be more rectangular in general form, although each of the root and crown of the bellows portion must be curved to permit satisfactory formation in the process as outlined below.

The bellows portion 18 may be located anywhere along the overall length of the conduit 10. In one configuration as shown in FIG. 1, the bellows portion 18 is substantially adjacent the outlet end 14. The invention however is not limited to the precise location of the bellows portion 18 within the overall conduit 10. If the bellows portion 18 is located more centrally in the conduit 10 then there may be another more rigid portion extending between the end of the bellows portion 18 and the outlet end 14. Also if more flexibility is required of the conduit, it may be possible to incorporate either a longer bellows portion 18 or a plurality of such bellows portions to give the conduit the necessary flexibility. However, in all cases, the bellows portion 18 is located intermediate the inlet end 12 and the outlet end 14 of the conduit 10.

By deformation of the bellows portion 18, the relative location of the inlet end 12 with respect to the outlet end 14 of the conduit, may be varied. The amount of variation possible is a function of the length and shape of the bellows portion 18, the number of such bellows portions and the material and thickness of material chosen. These are all open to the designer to make a fuel filler pipe of any configuration desired and with any degree of flexibility desired.

The rigid portion 16 and the bellows portion 18 may most advantageously be manufactured in a blow molding process. In the typical blow molding process, a parison is extruded to hang substantially vertically from an extrusion head. Preferably the parison is extruded in the form of a multi-layer parison comprising a barrier layer for inhibiting fuel vapour penetration and a inner electrically conductive layer for conducting any static electricity which may build up in the conduit. After extrusion, a mold comprising complimentary mold portions is closed around the parison. A pin or other similar device is located within the interior of the parison and blowing gas under pressure is delivered to the interior of the parison. The parison will then expand outwardly under the pressure from the blowing gas to assume the external configuration defined by the mold cavity. Because the parison material is hot at the time of blowing, there is a certain amount of flow of parison material along the wall of the parison being blown. However, because of the stretching of the parison in the vicinity of the bellows portion, the wall thickness of the finished conduit in the vicinity of the bellows portion 18 may be slightly thinner than the wall thickness at other portions of the conduit.

In order to form the rigid portion 16 and the bellows portion 18 of the conduit 10 as shown in FIG. 1, the cavity defined by the mold has a first portion which defines the rigid portion 16 and a second portion which defines the bellows shaped portion 18. When the mold is closed, the rigid portion 16 and the bellows portion 18 may be formed simultaneously in a single blow molding operation. This results in a unitary structure having no need for mechanical joints between the inlet end 12 and the outlet end 14.

The inlet end 12 of the conduit 10 includes structure for retaining a filler cap. In addition, it is desirable that the inlet end act as effectively as possible to ensure that there is no hydrocarbon vapour leakage and is equipped to position the fuel filler nozzle during the filling operation. The inlet end 12 comprises an insert 40 illustrated in perspective in FIG. 3. The insert 40 is electrically conductive for grounding purposes and may be metallic or plastic or reinforced plastic which is or may be made, electrically conductive or combinations of the foregoing. Advantageously, the insert is made from reinforced plastic which is electrically conductive. The insert 40 comprises a generally cylindrical portion 42, a generally inwardly tapering funnel portion 44 and a retaining cup portion 46 including a generally cylindrical wall structure 48.

The inlet end 12 of the fuel filler conduit 10 has an enlarged diameter portion so that the internal diameter of the plastic part adjacent the filler end has a larger internal diameter than over the remainder of the length of the rigid portion 16. The enlarged diameter enables the insert 40 to be slipped into the end 12 of rigid portion 16 with the cylindrical portion 42 and the funnel portion 44 residing within the rigid portion 16 and the cylindrical wall structure 48 of the retaining cup portion 46 encircling the end of the rigid portion 16.

Figure 4:
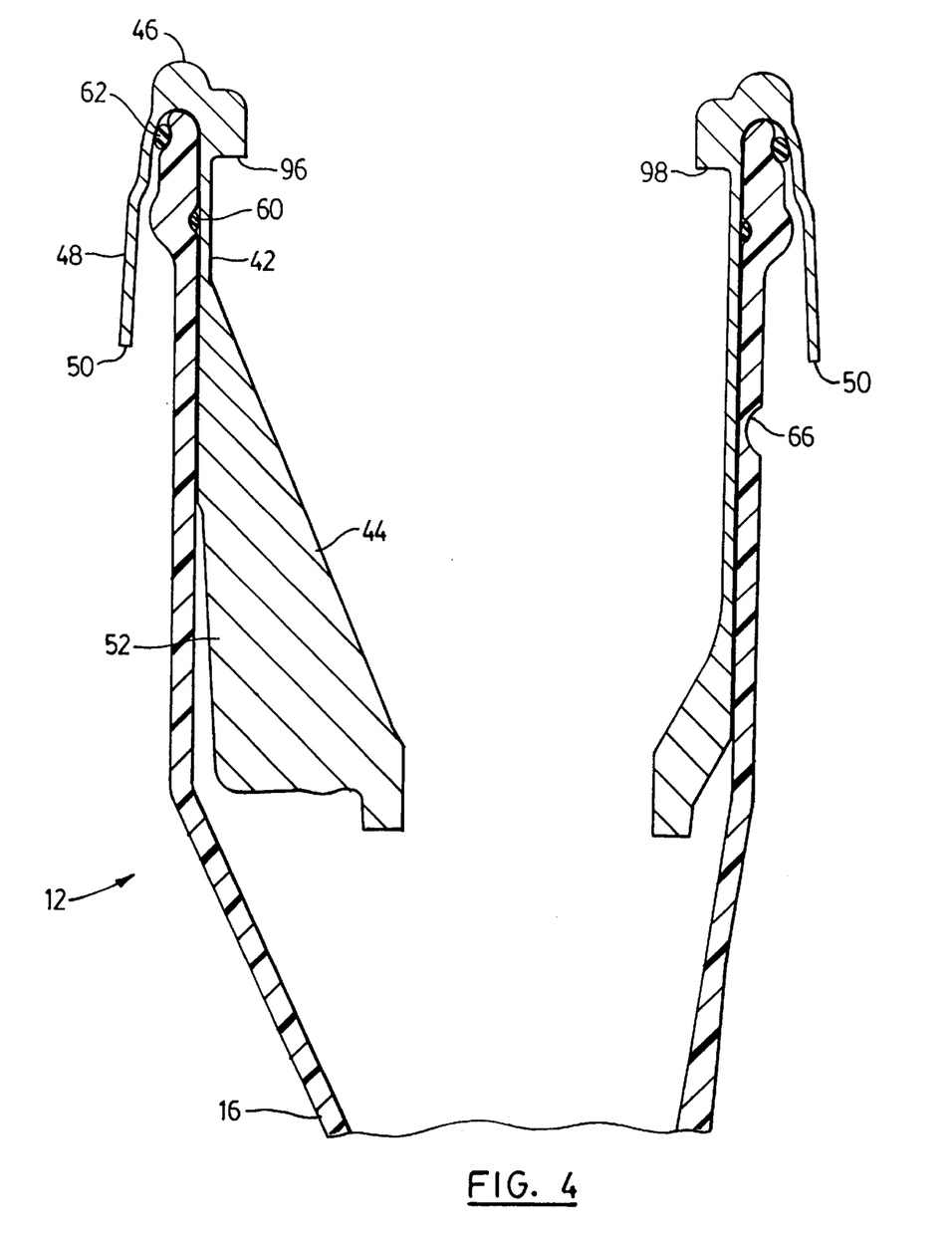
FIG. 4 is a cross section through the insert of FIG. 3.

FIG. 4 illustrates in cross-section, the end 12 of the fuel filler conduit 10 with the insert 40 inserted in place. As shown, the exterior diameter of the generally cylindrical portion 42 is substantially equal to the internal diameter of the end 12 of the rigid portion 16. This ensures that there is a tight fit between the exterior of the insert 40 and the interior of the rigid portion 16. As the interior surface of the rigid portion conduit 16 is capable of conducting static electricity, and as the insert is itself electrically conductive, there is a good electrical path from the inside of the rigid portion 16 directly to the insert 40. Thus, when a conductive fuel filler nozzle is placed within the insert 40 for purposes of adding fuel to the fuel nozzle, there will be an electrical connection between the nozzle of the fuel filler and the insert. There will be an electrical path from the insert to the inner layer of the conduit. This ensures grounding of the entire fuel system to a common potential so as to inhibit the build up of static electricity which may otherwise cause sparks.

When the fuel tank is filled, there will be fuel vapours within the conduit 10. As explained above, the fuel filler conduit itself will have a barrier layer to inhibit passage of hydrocarbon vapours through the walls of the fuel filler conduit 10. However, steps must be taken to seal the path from the interior of the fuel filler conduit 10 to the ambient atmosphere. A first seal is accomplished by means of an internal O-ring 60. The internal O-ring 60 is captured between the exterior surface of the cylindrical portion 42 of the insert 40 and the interior surface of the rigid portion 16. This provides a good seal. However, additional sealing may be obtained by using an exterior O-ring 62. The exterior O-ring 62 is captured between the outer surface of the rigid portion 16 and the inner surface of the cylindrical wall structure 48. The interior O-ring and the exterior O-ring 60, and 62 respectively, provide a sufficient and significant barrier to passage of hydrocarbon fuels along any gap which may exist in the fit between the exterior of the insert and the interior of the rigid portion 16.

In order to further ensure that there is a good contact between the insert 40 and the rigid portion 16, an interference dimple 66 may be provided on the exterior surface of the fuel filler conduit. The dimple is simply an inward bulging of the wall of the rigid portion 16. A number of such dimples may be spaced about the exterior surface of the fuel filler conduit ensuring that there is the desirable fit. The tight fit ensures that there is good electrical contact between the interior layer of the rigid portion 16 and the insert 40 as well as assisting in retaining the insert within the rigid portion 16 and sealing the insert 40 within the rigid portion 16 to inhibit passage of fuel vapours.

Figure 5:
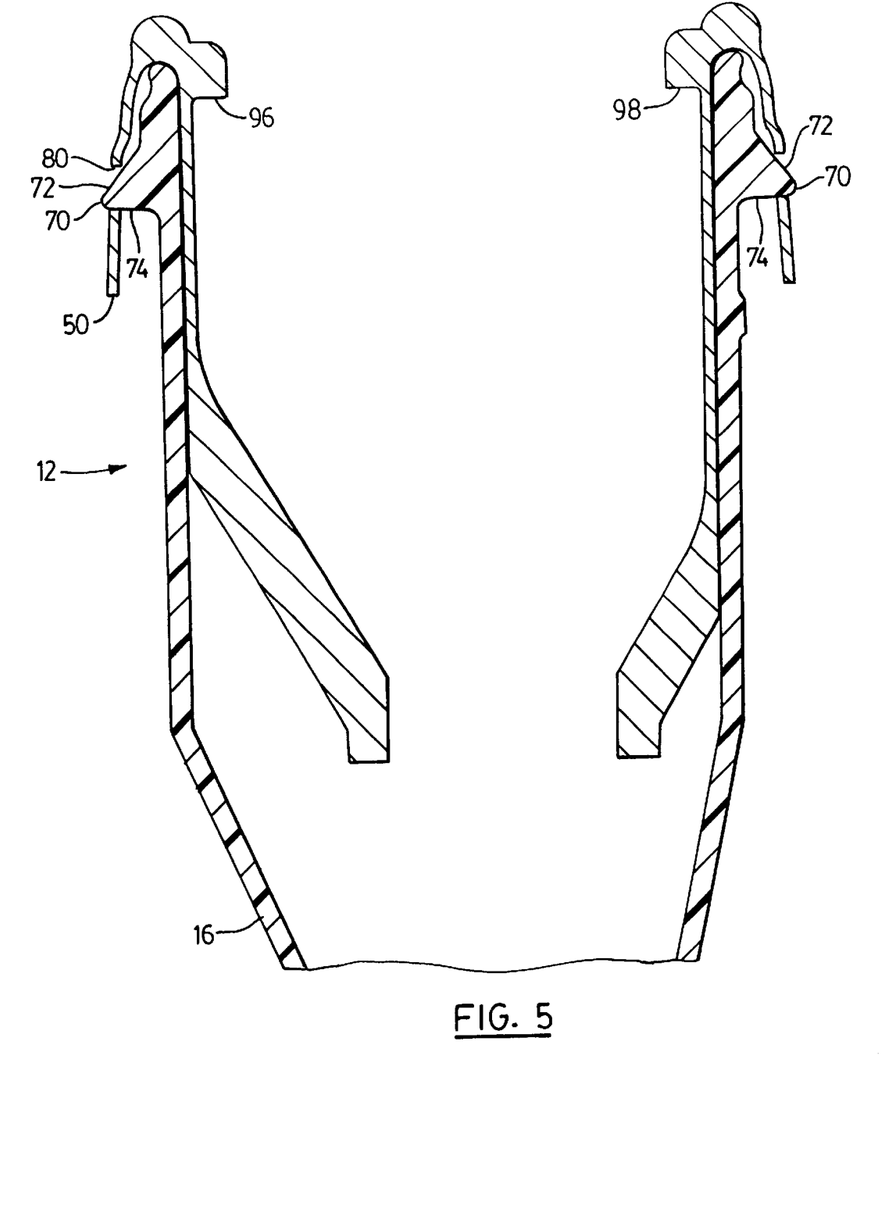
FIG. 5 is a cross section through the insert of FIG. 3.

FIG. 5 is a figure which is similar to FIG. 4 but the plane has been rotated 45° as compared to the plane illustrated in FIG. 4. The section taken at this plane illustrates that the end of the rigid portion 16 comprises a plurality of outwardly projecting barbs 70. The barbs may be formed in the plastic using slides in the portion of the blow mould adjacent an end of the parison to be formed. The barbs act as outwardly directed projections having an upper slopped surface 72 and a lower substantially radially projecting surface 74. Two such barbs 70 are illustrated in FIG. 5. Advantageously the fuel filler conduit 10 comprises four such barbs, equally spaced about the periphery of the conduit 10. From review of FIG. 5 and FIG. 3, it will be noted that the cylindrical wall structure 48 comprises a plurality of slots 80. Preferably, the cylindrical wall structure 48 comprises four such slots 80 arranged around the periphery. Each barb 70 projects outwardly through one of the slots 80 when assembled. The interreaction of the barbs 70 and the slots 80 precludes removal of the insert 40 from the rigid portion 16 once installed, unless the barbs are deformed.

As the insert 40 is pressed into the end of the rigid portion 16, the lower edge 50 of the wall structure 48 first encounters the slopped surface 72 of the barb. Further pressure on the insert 40 thus slightly deforms the cylindrical wall structure 48 and each of the barbs 70. When the barbs 70 then spring into the slots 80, the substantially radial surface 74 of the barb 70 captures the lower edge of the slot 80, thereby precluding any easy removal of the insert 40 from the rigid portion. By appropriate dimensioning and tolerances, the interreaction of the slots 80 and the barbs 70 ensure that the inner O-ring 60 and the outer O-ring 62 are captured in their desired location and subjected to the predetermined design stress to achieve the acceptable seal.

Figure 6:
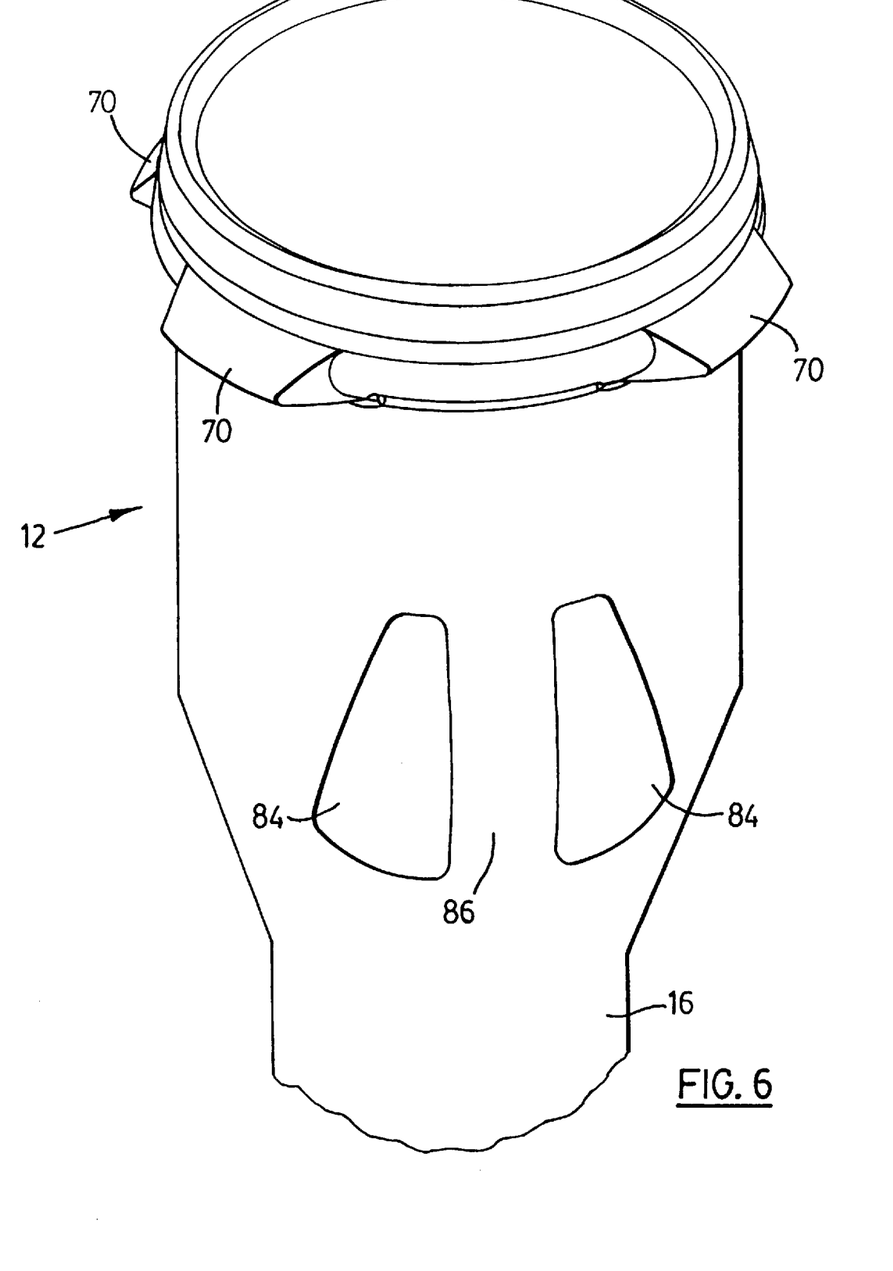
FIG. 6 is a perspective view of the thermoplastic inlet end of the conduit of FIG. 1.

FIG. 6 illustrates the end of the rigid portion 16. Adjacent the end of the enlarged portion, the surface of the rigid portion 16 includes a pair of depressions 84. The two depressions 84 extend inwardly and define therebetween, an internal recess 86. The recess 86 acts as a keyway to accommodate a key discussed below.

Figure 7:
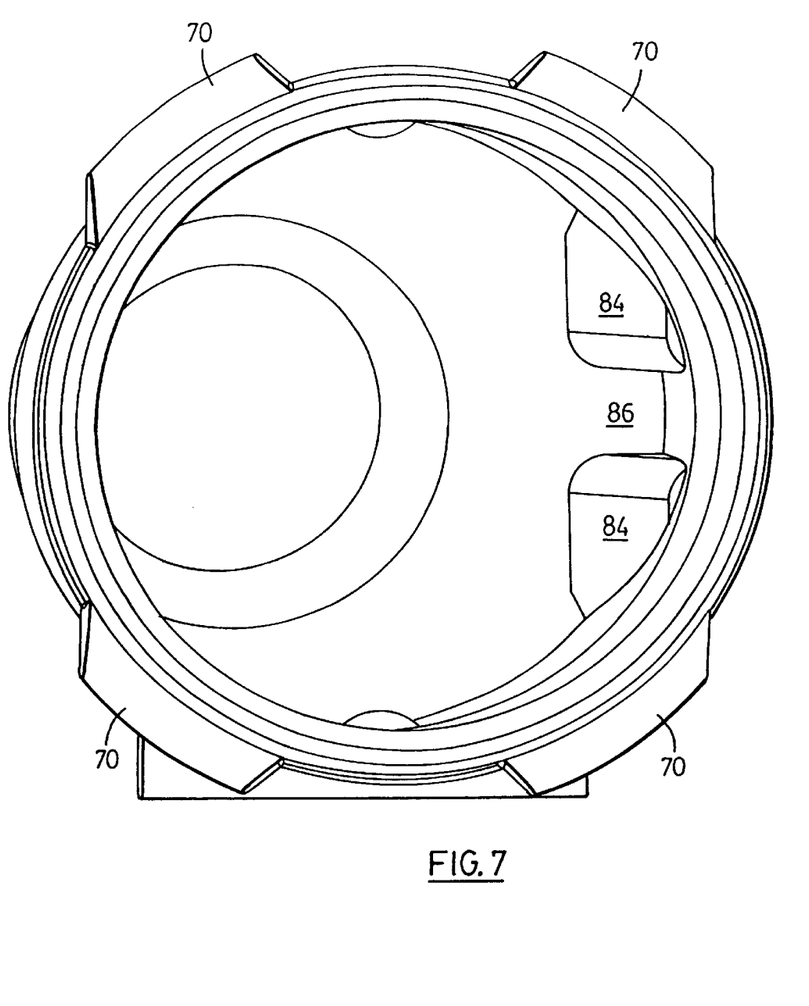
FIG. 7 is a perspective view of the inlet end of FIG. 6 looking in the direction of fuel flow.

FIG. 7 illustrates the filler end of the rigid portion 16 looking in the direction of fuel flow from a nozzle toward the conduit and fuel tank. This view illustrates the two depressions 84 as well as the recess 86.

Returning now to FIG. 3, it will be observed that the funnel portion 44 of the insert 40 comprises an outwardly projecting element which forms a key 52. The key 52 projects radially outwardly from the funnel portion and has a circumferential width which is substantially equally to the circumferential width of the recess 86. This serves as a locating means to ensure that the insert 40 is inserted into the end of the rigid portion 16 in the desired and proper alignment. Proper alignment is advantageous for several reasons. Firstly, the slots 80 must be aligned with the barbs 70. More particularly however, the arrangement and angle of the funnel portion 44 is such as to ergonomically accept the typical curvature of a fuel filler nozzle and to direct it into a desirable alignment with the axis of the fuel filler conduit at the filler end.

Figure 8:
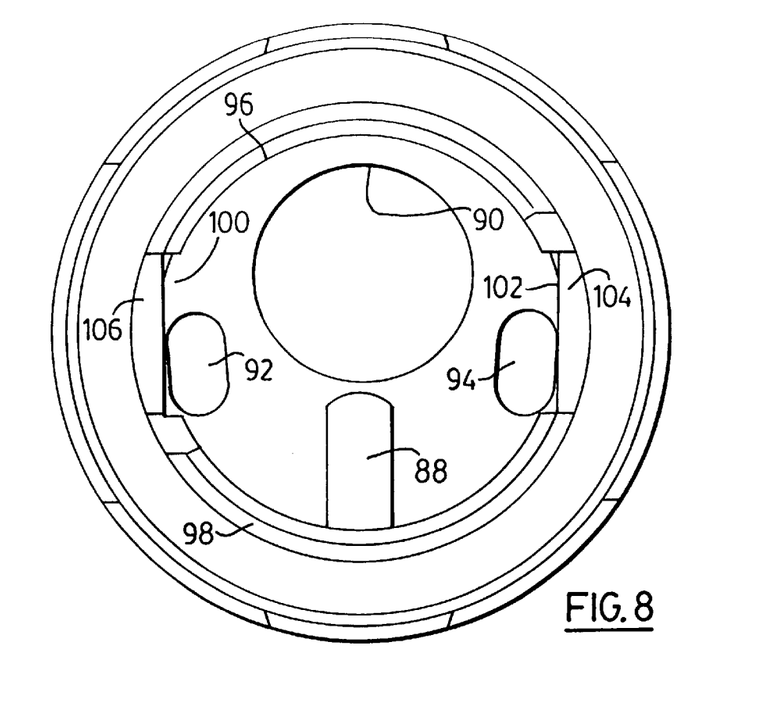
FIG. 8 is an end view of the insert of FIG. 3 looking in the direction of fuel flow.
Figure 9:
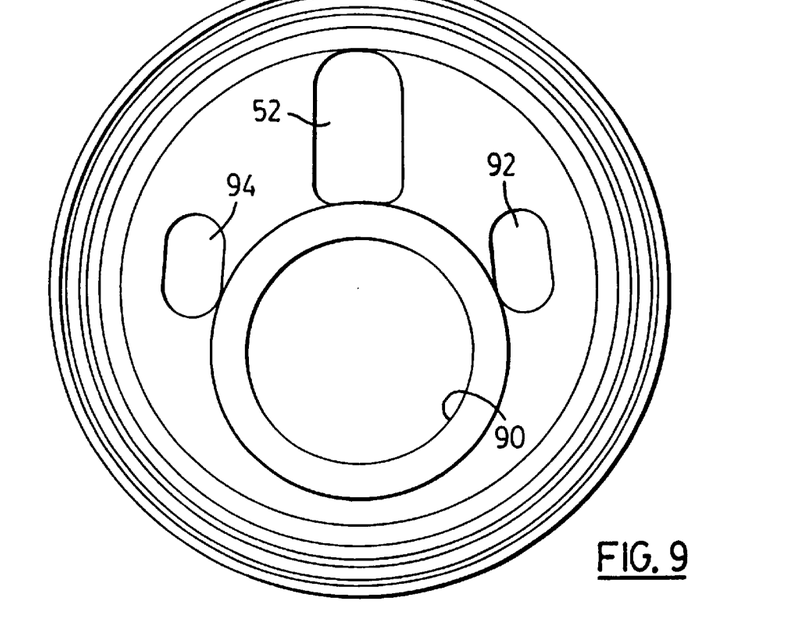
FIG. 9 is an end view of the insert of FIG. 3 looking in the opposite direction from FIG. 8.

FIG. 8 illustrates the insert 40 looking into the insert in the direction of intended fuel flow. FIG. 8, when reviewed along with FIGS. 3 and 4, illustrates the structure of the insert. Firstly, it will be observed, that the internal surface of the funnel portion 44 of the insert 40 comprises a slight raised rib 88. The rib 88 is intended to guide the fuel nozzle toward the outlet aperture 90 of the insert 40. From review of FIGS. 3 and 8, it will be noted that the insert also includes a pair of relief ports 92 and 94.

The insert 40 additionally includes a pair of arcuate cap trap lips 96 and 98 which are separated by slots 100 and 102. From review of FIG. 8, it will also be noted that there are a pair of cap limiting ledges 104 and 106 located directly below the slots 100 and 102.

A typical fuel cap has a pair of outwardly projecting tangs. The tangs are dimensioned so as to fit within the slots 100 and 102. As the cap is turned, the tangs pass downwardly into the insert 40 until a portion of the cap hits the cap limiting ledges 104 and 106. As the cap is turned, the tangs on the cap pass beneath the cap trap lips 96 and 98. The cap trap lips are angled slightly similar to a thread, drawing the cap in, to ensure that the cap is drawn tightly against the insert so that the cap may seal against the insert at the upper edge of the insert.

When the cap is removed, the filler nozzle is inserted into the insert 40. In most cases, it will be the upper edge of the filler nozzle which is guided toward the filler aperture 90 by riding along the rib 88. The tip of the nozzle will also be guided by the inside surface of the funnel portion 44. Ultimately, the fuel nozzle will come to a position where it projects through the filler aperture 90 into the interior of the conduit 10.

As the fuel fills the tank, air is expressed upwardly through the fuel filler conduit 10. When the tank reaches a full condition, the automatic shut off on the fuel filler nozzle should ensure that the flow of fuel stops. However, administrative regulations in most countries require that there be provided a vent system so that the fuel filling pressure does not come to bear on the walls of the tank structure which may lead to a burst tank. Thus, if any liquid fuel should continue to flow when the fuel tank and conduit 10 are full, then fuel can pass through the relief ports 92 and 94 where it would splash back on the operator thereby alerting the operator to the failure so that the pump can be manually stopped. The area available for relief flow is the combination of the cross-sectional area of the relief port 92, the relief port 94, and any substantially annular shaped gap which may exist between the outer diameter of the fuel filler nozzle and the diameter of the filler aperture 90.

The structure illustrated in FIGS. 1 and 2 may be made from multi-layer blow moldable plastic having the necessary barrier layers. The barrier layer is then effective to inhibit permeation of fuel vapours through the fuel filler conduit throughout the length of the fuel filler from inlet end 12 and the outlet end 14. Alternatively the structures may be made of plastic suitable for automotive fuel system components which also act as a barrier to permeation losses such as the Dupont resin SELAR™. As the structure providing flexibility is unitary with the rigid portion, there is no need for mechanical joints or seals between these portions. The elimination of such joints then gives a structure which has a higher effective permeation barrier as compared to structures having such mechanical joints, while at the same time possessing the desired flexibility.

Figure 10:
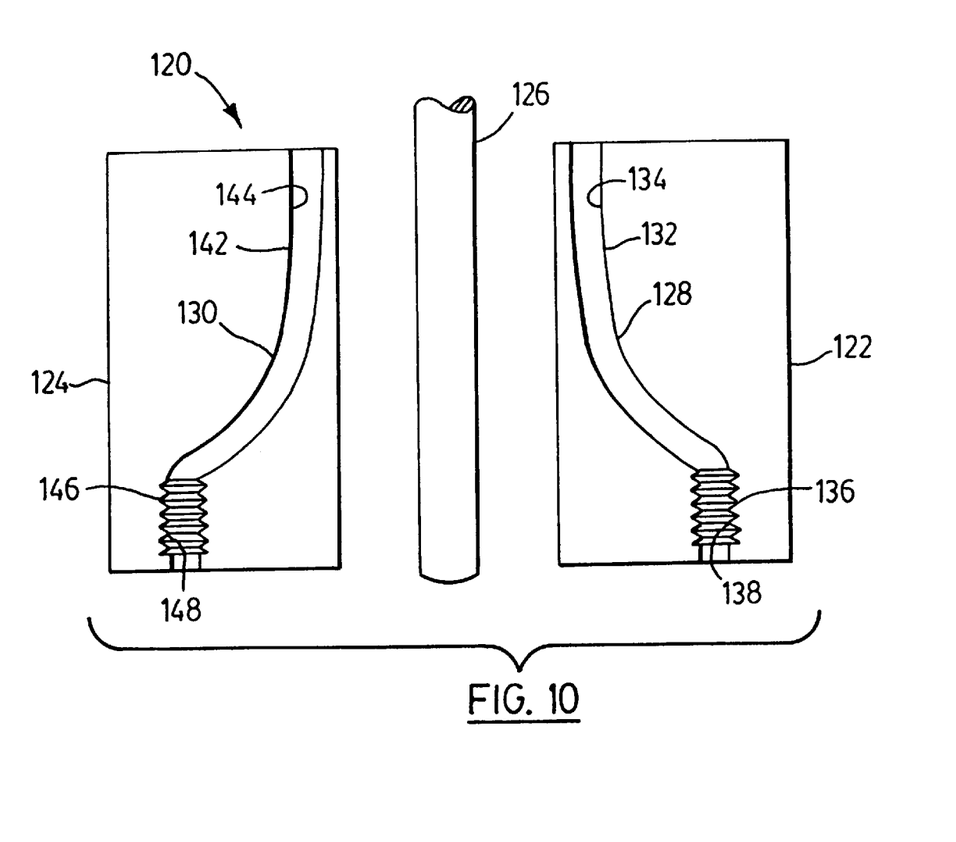
FIG. 10 illustrates an example of a process for making the molded portion of the conduit of FIG. 1.

FIG. 10 illustrates a mold which may be used to make the flexible fuel filler pipe in accordance with one embodiment of this invention. Most preferably, the fuel filler pipe may be made as a single piece member in a blow molding operation. The process may be more clearly understood by reference to FIG. 10. The mold for blow molding indicated generally at 120 comprises complimentary mold portions 122 and 124. In FIG. 10, the mold portions 122 and 124 are shown on either side of a parison 126 which has been extruded from an extrusion head (not shown). In FIG. 10, the mold portions 122 and 124 have been turned 90° in order to illustrate the mold cavities therein. Mold portion 122 comprises a mold cavity 128. Mold portion 124 comprises a complimentary mold cavity 130. The mold cavity 128 comprises a first portion 132 having a smooth surface 134 from molding a first portion of a conduit. The mold cavity 128 also includes a second portion 136 having a convoluted surface 138 for molding a second portion of the conduit.

Similarly, the mold cavity 130 comprises a first portion 142 having a smooth surface 144. Additionally, the mold cavity 130 comprises a second portion 146 having a convoluted surface 148. When the mold portions 120 and 124 are closed together in typical blow molding fashion, the mold cavities will close about the parison 126. In typical blow molding techniques, a pin is inserted into the parison 126 when it is confined by the cavities 128 and 130. Gas under pressure is introduced into the interior of the parison through the needle and the parison expands outwardly so that the exterior surface of the parison is formed to match the contour of the mold cavities 128 and 130. The smooth portions 132 and 142 mold a first portion of the conduit so that that first portion will have a smooth exterior surface. The convoluted portions 136 and 146 mold a second portion of the conduit so that the second portion of the conduit will have a bellows shape.

When the parison is cooled, the mold 120 is opened and the molded part is released from the mold portions. This produces a single piece conduit suitable for use as a fuel filler conduit in which there is a first portion having a smooth exterior surface and an integral second portion which has a bellows shape.

It will be obvious to those familiar with the blow molding art, that the configuration of the conduit produced in the blow molding is widely variable. The bellows portion of the conduit may be arranged anywhere along the length of the conduit as desired.

Figure 11:
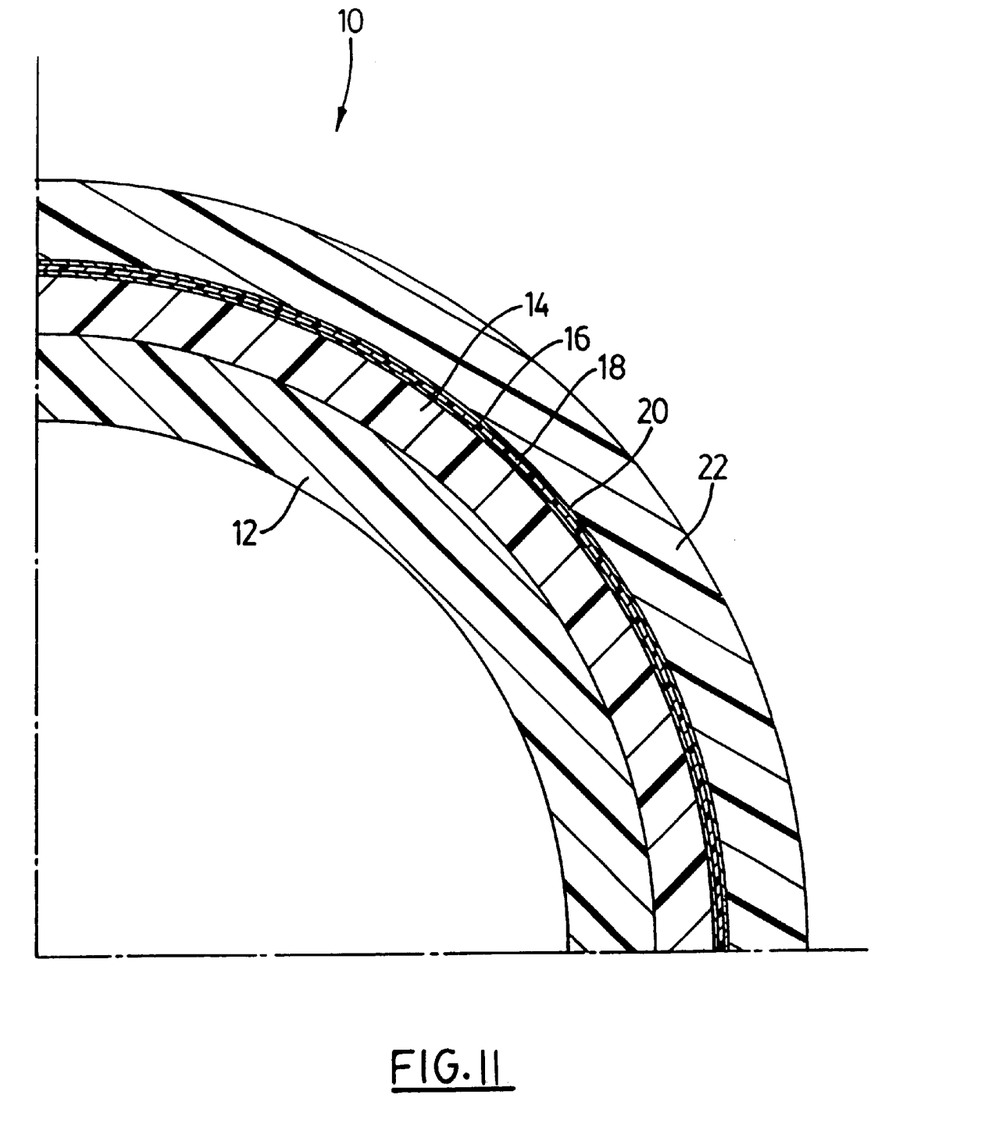
FIG. 11 is a schematic cross-sectional view of a quarter portion of the multi-layer conduit of FIG. 1.

The multi-layer conduit of the embodiment shown in FIGS. 1 and 2 at 10 comprises a plurality of layers. As shown in FIG. 11, the conduit comprises six layers commencing at the radially innermost layer 112 and progressing outwardly through layers 114, 116, 118, 120 and 122.

The inner layer 112 is made from electrically conductive, high density, polyethylene. The next adjacent layer 114 is made from high density polyethylene material which may be either virgin material or scrap material as will be discussed more fully hereinafter. The conduit includes a barrier layer 118 which is bonded to the adjacent layers by a layer of adhesive 16 on the radially inner surface and a layer of adhesive 120 on the radially outer surface. The outermost layer 122 is a layer of high density polyethylene.

The barrier layer 118 is made of ethylene, vinyl alcohol copolymer (EVOH). The barrier layer of ethylene, vinyl alcohol copolymer serves as a barrier for passage of gaseous hydrocarbons which are a typical components of fuels. The EVOH product is available from a number of suppliers. One such product is identified by the trade mark LC-101A and is available from Eval Company of America. The product is 27 mole percent ethylene and is sold as a high barrier resin for multi-layer barrier structures. This resin is said by its manufacturer to be the highest gas barrier EVOH material available. According to the manufacturer's specification, the resin may be used as an interior barrier layer of a multi-layer food package as outlined by the U.S. Food and Drug Administration Regulations, provided that the EVOH layer is separated from direct food contact by a polymeric layer at least 1 ml thick. It has been found that this resin produces a suitable barrier to prevent transmission of hydrocarbon vapours typical of those found in fuels such as gasoline through the fuel filler conduit manufactured in accordance with this preferred embodiment of the invention.

In order to best adhere the barrier layer 18 to the layers of the conduit which are radially inwardly of and radially outwardly of, the barrier layer, adhesives 116 and 120 are used on the inner and outer surfaces of the barrier layer 18 respectively. A suitable adhesive for use in adhering the EVOH layer is the adhesive sold under the trade mark ADMER by Mitsui Petrochemicals (America) Ltd. This adhesive is sold for adhering the layer EVOH film to high density polyethylene or adhering high density polyethylene to nylon. In the preferred embodiment illustrated, the conduit has high density polyethylene next to both surfaces of the barrier layer and thus the same adhesive can be used on each surface of the barrier layer 16.

The inner layer 112 will be in contact with fuel passing along the conduit. Thus, static electricity is likely to be generated at the inner surface of the inner layer 112. The static electric may be present in the fuel from its remote storage or may be generated by the passage of the fuel along the conduit. As turbulence in the fuel will promote the formulation of static electricity, the amount of static electricity that will be generated may be dependent upon the configuration of the conduit which, in turn, may promote turbulence. In addition, the quality of the surface finish of the conduit may also be a factor in generating turbulence and thus generation of static electricity. The inner layer 112 is made suitably electrically conductive to dissipate static electricity thus preventing the build up of sufficient charge to cause sparks. High density polyethylene may be made sufficiently conductive by including within the resin, carbon black. One particularly advantageous form of carbon black is that sold under the trade mark PRINTEX XE 2 by Degussa AG of Frankfurt, Germany. Addition of carbon black, such as PRINTEX XE 2, into high density polyethylene produces a significant drop in the resistance of the polymer to electric current at relatively low concentration. According to the manufacturer of PRINTEX XE 2, only approximately ⅓ to ¼ of the amount of conventional carbon black need be added to a polymeric resin to generate suitable conductivity for anti-static suitability of the resulting mixed resin. By way of example, the manufacturer suggests that additions of about 5–15% of PRINTEX XE 2 are sufficient to achieve conductivity values in the area of <$10^2$ ohm×cm in thermoplastics.

In accordance with the preferred embodiment considerable economies may be achieved by recycling scrap high density polyethylene. As will be well understood by those familiar with the blow molding art, there are often scrap or flash materials which must be removed from finished products. The non-use of that scrap material represents a cost. This product provides an opportunity to make use of what would otherwise would be waste high density polyethylene material. The material is reground and fed to the melt and extrusion process for use in the layer 114 of the conduit 10. The adjacent layer 114 thus may be made from virgin, high density polyethylene or scrap regrind material from this multi-layer conduit or scrap regrind, high density polyethylene, or combinations of the foregoing.

The outer layer 122 is preferably manufactured from virgin, high density polyethylene.

In order to provide the finished strength for use in most automotive applications, the layers are made at varying thicknesses. The thicknesses depend in part on the diameter of the conduit. Thus the values given below are given in weight percent terms of the over all unit length of conduit. The internal layer 112 may comprise approximately 20% by weight conductive high density polyethylene. The next layer 114 may comprise about 40% by weight of the material or combination of materials discussed above. The barrier layer 118 of EVOH material may comprise approximately 3% by weight of the conduit. Each adhesive layer 116, 120 on either side of the barrier layer 116 may comprise approximately 3% by weight of the conduit. The outermost layer 122 of virgin high density polyethylene material may comprise approximately 37% by weight of the conduit.

It is desirable that the combination of the innermost layers 112 and 114 together comprise at least 50% and preferably 60% of the weight of the conduit. This provides substantial weldable material at the inner surface of the multi-layer conduit. When the conduit is to be joined to other structures such as the tank at one end or a fuel filler at the opposite end, the material may most advantageously be joined by forming welds of the thermoplastic material. Typically, such welds are achieved by heating the surrounding material to which the conduit is to be joined as well as the multi-layer conduit to a molten condition. The two materials are then brought into contact under pressure so that the material from the multi-layer conduit may fuse together with the material to which the multi-layer conduit is to be joined. It has been observed that appropriate welds can be made most easily if the combination of layers 112 and 114 are of weldable material and together comprise at least 50% of the weight of the conduit. This has been observed to provide high quality acceptable welds.

Another requirement for multi-layer conduits to be used as fuel fillers is ruggedness or resilience. The conduit may be handled roughly after its manufacture in transit to the installation where the conduit is to be fixed to a tank or to a vehicle. It is thus desirable that the exterior material has substantial impact resistance. This impact resistance may also be of considerable value once the fuel filler is installed on a vehicle to help resist failure of the fuel filler during the life of the vehicle. In order to assure as much impact resistance as possible given the nature of the material, it is desirable that the outer layer 122 be manufactured from virgin, high density polyethylene material. The virgin material will thus have predictable impact strength which would otherwise be somewhat variable if it were mixed with scrap material. Virgin, high density polyethylene material advantageously provides suitable impact resistance for this structure.

Further and other changes and amendments may be made to the invention without departing from the scope of the invention which is defined in the attached claims.

We claim:

1. A fuel filler conduit for use in automotive applications for connecting to a fuel tank, said conduit having an inlet end, an outlet end, and including a single piece molded portion comprising a first portion and a second portion, and wherein said first portion is generally rigid and has a fixed configuration, and said second portion comprises a bellows portion, and said bellows portion is located intermediate said inlet end and said outlet end, so that the relative location of the inlet end with respect to the outlet end may be changed by deforming said bellows portion, and wherein said molded portion comprises a plurality of layers including, an inner layer, said inner layer comprised of electrically conductive high density polyethylene, an outer layer, said outer layer comprised of high density polyethylene and, a barrier layer for inhibiting passage of gaseous hydrocarbons from inside said filler conduit through said conduit as hydrocarbon fuel travels long said conduit, said barrier layer comprising ethylene vinyl alcohol copolymer and said barrier layer located intermediate said inner and outer layers, said conduit further comprising adhesive for adhering said barrier layers to layers radially inwardly of and radially outwardly of said barrier layer.

2. The device of claim 1, wherein said bellows portion comprises a plurality of convolutions and each convolution is defined by a root section and crown section.

3. The device of claim 2, wherein said first portion has an internal diameter $d_1$, and said plurality of root sections have an internal diameter $d_2$ and $d_2$ is equal to or greater than $d_1$.

4. The device of claim 3, wherein said molded portion comprises an inner surface and said inner surface is electrically conductive.

5. The device of claim 1, wherein said conduit comprises an insert at said inlet end.

6. The device of claim 5, wherein said insert is electrically conductive and said insert contacts said electrically conductive inner surface of said molded portion.

7. The device of claim 6, wherein said insert comprises a generally cylindrical portion for contacting said inner surface of said molded portion conduit and a retaining cup portion, said retaining cup portion having a generally cylindrical wall structure.

8. The device of claim 7, wherein said conduit comprises at least one sealing ring for sealing said insert and said rigid portion to inhibit passage of fuel vapours therebetween.

9. The device of claim 8, wherein said conduit comprises a plurality of said sealing rings.

10. The device of claim 9, wherein said rigid portion comprises a plurality of outwardly projecting barbs and said cylindrical wall structure of said retaining cup portion of said insert comprises a plurality of slots for receiving said barbs.

11. The device of claim 10, wherein said insert comprises an outlet aperture and at least one relief port.

12. The device of claim 1 wherein said molded portion comprises an inner surface and said inner surface is electrically conductive and said conduit comprises an insert at said inlet end and said insert is electrically conductive and said insert contacts said electrically conductive inner surface of said molded portion, and wherein said insert comprises an outlet aperture and at least one relief port.

13. The device of claim 12 wherein said rigid portion of said conduit comprises a keyway adjacent said filler end and said insert comprises a key for insertion into said keyway for establishing a desired alignment of said insert with respect to said rigid portion.

14. A fuel filler conduit for use in automotive applications for connecting to a fuel tank, said conduit having an inlet end, an outlet end, and including a single piece molded portion comprising a first portion and a second portion, and wherein said first portion is generally rigid and has a fixed configuration, and said second portion comprises a bellows portion, and said bellows portion is located intermediate said inlet end and said outlet end, so that the relative location of the inlet end with respect to the outlet end may be changed by deforming said bellows portion, wherein said molded portion has a multi-layer wall structure including an inner layer and a barrier layer for substantially inhibiting passage of hydrocarbon vapors, said layers of said multi layer wall structure are bonded to adjacent layers;

said molded portion has an inner surface and said inner surface is electrically conductive;

said conduit comprises an insert at said inlet end;

said insert is electrically conductive and said insert contacts said electrically conductive inner surface of said molded portion;

said insert comprises a generally cylindrical portion for contacting said inner surface of said molded portion and a retaining cup portion, said retaining cup portion having a generally cylindrical wall structure;

said conduit comprises at least one sealing ring for sealing said insert and said rigid portion to inhibit passage of fuel vapours therebetween;

said conduit comprises a plurality of sealing rings;

said rigid portion comprises a plurality of outwardly projecting barbs and said cylindrical wall structure of said retaining cup portion of said insert comprises a plurality of slots for receiving said barbs, and said insert comprises an outlet aperture and at least one relief port.

15. The device of claim 14, wherein said rigid portion of said conduit comprises a keyway adjacent said filler end and said insert comprises a key for insertion into said keyway for establishing a desired alignment of said insert with respect to said rigid portion.

16. A fuel filler conduit for use in automotive applications for connecting to a fuel tank, said conduit having an inlet end, an outlet end, and including a single piece molded portion comprising a first portion and a second portion, and wherein said first portion is generally rigid and has a fixed configuration, and said second portion comprises a bellows portion, and said bellows portion is located intermediate said inlet end and said outlet end, so that the relative location of the inlet end with respect to the outlet end may be changed by deforming said bellows portion, wherein said molded portion has a multi-layer wall structure including an inner layer and a barrier layer for substantially inhibiting passage of hydrocarbon vapors, said layers of said multi layer wall structure are bonded to adjacent layers;

said molded portion comprises an inner surface and said inner surface is electrically conductive and said conduit comprises an insert at said inlet end and said insert is electrically conductive and said insert contacts said electrically conductive inner surface of said molded portion, and wherein said insert comprises an outlet aperture and at least one relief port, and said rigid portion of said conduit comprises a keyway adjacent said filler end and said insert comprises a key for insertion into said keyway for establishing a desired alignment of said insert with respect to said rigid portion.

\* \* \* \* \*